(12) United States Patent
Agrawal (10) Patent No.: US 7,785,703 B2
(45) Date of Patent: *Aug. 31, 2010

(54) FACER AND FACED POLYMERIC ROOFING BOARD

(75) Inventor: Gaurav Agrawal, Aurora, CO (US)

(73) Assignee: Johns Manville, Denver, CO (US)

( * ) Notice: Subject to any disclaimer, the term of this patent is extended or adjusted under 35 U.S.C. 154(b) by 734 days.

This patent is subject to a terminal disclaimer.

(21) Appl. No.: 11/305,783

(22) Filed: Feb. 9, 2006

(65) Prior Publication Data

US 2006/0276093 A1 Dec. 7, 2006

Related U.S. Application Data

(63) Continuation-in-part of application No. 11/126,583, filed on May 11, 2005.

(51) Int. Cl.
*B32B 9/00* (2006.01)
(52) U.S. Cl. .............. 428/318.4; 428/318.8; 428/319.3; 428/76; 428/317.9; 52/309.9; 52/309.14; 52/309.15
(58) Field of Classification Search .............. 428/318.4, 428/140, 306.6, 307.3, 318.8, 304.4, 317.9, 428/319.3, 76, 172; 52/309.1, 309.9, 309.14, 52/302, 309.15
See application file for complete search history.

(56) References Cited

U.S. PATENT DOCUMENTS

| | | | |
|---|---|---|---|
| 4,351,873 A * | 9/1982 | Davis | 428/198 |
| 4,438,166 A * | 3/1984 | Gluck et al. | 428/113 |
| 5,112,678 A | 5/1992 | Gay et al. | |
| 5,192,607 A * | 3/1993 | Soukup | 428/314.4 |
| 5,695,870 A * | 12/1997 | Kelch et al. | 428/318.4 |
| 5,891,563 A * | 4/1999 | Letts | 428/318.4 |
| 6,093,481 A * | 7/2000 | Lynn et al. | 428/217 |
| 6,358,599 B1 * | 3/2002 | Deibel et al. | 428/308.4 |
| 6,368,991 B1 | 4/2002 | Horner, Jr. et al. | |
| 6,858,550 B2 | 2/2005 | Ahluwalla | |
| 6,872,673 B2 * | 3/2005 | MacAulay | 442/152 |
| 6,875,308 B2 * | 4/2005 | Kajander et al. | 162/135 |
| 7,049,251 B2 * | 5/2006 | Porter | 442/79 |
| 2003/0134079 A1 | 7/2003 | Bush et al. | |

* cited by examiner

*Primary Examiner*—Richard E Chilcot, Jr.
*Assistant Examiner*—Chi Q Nguyen
(74) *Attorney, Agent, or Firm*—Robert D. Touslee (57) ABSTRACT

A prefabricated, faced roofing board composite includes a first board layer made of a polymeric material or a predominantly polymeric material and a fire and weather resistant fiberglass-based facer bonded to a top major surface of the first board layer and forming a top major surface of the composite. The fiberglass-based facer is substantially impervious to the passage of hot gases of combustion, water, and water vapor through the thickness of the fiberglass-based facer. The faced composite can be a cover board, an insulation board; can include cover board and insulation board layers; and can include cover board, insulation board, and baseboard layers. A second fiberglass-based facer that is substantially impervious to the passage of hot gases of combustion through its thickness can form a bottom major surface of the composite. The polymeric material or predominantly polymeric material of the board layer to which each fiberglass-based facer is bonded penetrates part of the way through, but not completely through, the fiberglass-based facer.

34 Claims, 5 Drawing Sheets

FACER AND FACED POLYMERIC ROOFING BOARD

CROSS REFERENCE TO RELATED APPLICATIONS

This application is a continuation-in-part of U.S. Ser. No. 11/126,583 filed on May 11, 2005, which is hereby incorporated by reference in its entirety.

BACKGROUND OF THE INVENTION

The subject invention relates to low-slope roofs that are typically found on commercial and industrial buildings, and in particular to an improved fire and moisture resistant fiberglass-based facer that is impervious or substantially impervious to the passage of hot gases of combustion, water, and water vapor through the thickness of the fiberglass-based facer and to prefabricated faced roofing board composites for use on low-slope roofs that include one or more polymeric or predominately polymeric board layers and are faced on at least one major surface with the fire and moisture resistant fiberglass-based facer of the subject invention.

Commercial and industrial buildings typically have roofs with low-slope roof decks. The roofing systems for these low-slope roofs typically include one or more layers of a low-density roofing insulation, a high-density layer of roofing cover boards that overlie the low-density roofing insulation layer(s), and a waterproofing membrane that overlies the layer of cover boards. If not protected, the layer(s) of low-density insulation, such as a low-density polymer-based foam insulation, can be partially crushed or otherwise damaged from worker traffic over the insulation, the placement of heavy objects on the insulation, the weather, and other causes commonly encountered in roofing construction. The layer of high-density roofing cover boards that overlies the one or more layers of low-density insulation, protects the more fragile low-density insulation from damage, provides a suitable substrate for the attachment of the overlying waterproofing membrane, and augments the insulating function of the low-density insulation. The uppermost waterproofing membrane layer overlying the cover board layer protects the underlying cover board and insulation layers from moisture and other adverse climatic conditions. Normally, these three components (the low-density insulation boards, the high-density roofing cover boards, and the waterproofing membrane) of the roofing system are separately manufactured and separately and successively applied to the low-slope roof deck. While these roofing systems function very well, there has remained a need to provide an improved prefabricated faced roofing cover board composite, an improved prefabricated faced roofing insulation board composite, and an improved prefabricated faced roofing board composite that includes at least an insulation board layer and a roofing cover board layer. With the use of such improved prefabricated faced roofing board composites, roofing systems for low-slope roof decks can be improved and/or the time, labor and costs associated with the installation of roofing systems on low-slope roof decks can be reduced.

SUMMARY OF THE INVENTION

The subject invention provides an improved fire and moisture resistant fiberglass-based facer and prefabricated faced roofing board composites that are faced with the improved fiberglass-based facer. The prefabricated faced roofing board composites of the subject invention that are faced with the improved fire and moisture resistant fiberglass-based facer of the subject invention include: an improved prefabricated faced polymeric or predominately polymeric roofing cover board composite, an improved prefabricated faced polymeric or predominately polymeric roofing insulation board composite, an improved prefabricated faced polymeric or predominately polymeric roofing board composite that includes at least an insulation board layer and a roofing cover board layer; and an improved prefabricated faced polymeric or predominately polymeric roofing board composite that includes at least two polymer or predominately polymeric material layers that differ from each other in density, composition, density and composition, or otherwise differ from each other in their physical and/or chemical characteristics. The prefabricated faced roofing board composites of the subject invention with the improved fire and moisture resistant fiberglass-based facer of the subject invention exhibit improved fire retardant properties and reduced flame spread characteristics.

The improved fire and moisture resistant fiberglass-based facer of the subject invention is substantially impervious to the passage of hot gases of combustion, water, and water vapor through the thickness of the fiberglass-based facer. Typically, the polymeric or predominately polymeric materials of polymeric roofing boards are not very fire resistant and the presence of normal blowing agents, such as pentane, within the polymeric or predominately polymeric foam materials of polymeric roofing boards further degrades the fire resistant properties of such roofing boards. It is believed that the nonporous nature of the fiberglass-based facer of the subject invention plus the fire retardant nature of the fiberglass mat or the fiberglass mat and mineral fillers of the fiberglass-based facer of the subject invention causes the fiberglass-based facer of the subject invention to function as both a fire barrier for the polymeric roofing board layer(s) of the roofing board composites of the subject invention and a thermal barrier that reduces the temperature of the underlying polymeric or predominately polymeric roofing board layer(s) of the roofing board composites of the subject invention. Thus, when compared with previous roofing board composites made of polymeric or predominately polymeric materials and faced with either paper facers or permeable coated or uncoated facers, the roofing board composites of the subject invention are more fire resistant and exhibit improved fire retardant and flame spread characteristics.

In a preferred embodiment of the fiberglass-based facer of the subject invention, the fiberglass-based facer includes a fiberglass mat with a first major surface which forms a first major surface of the facer and is adapted to overlay a major surface of a roofing board and a second major surface which is coated with a highly inorganic filled latex based coating material (limestone/latex coating mixture). The highly inorganic filled latex based coating material combines with the fiberglass mat to form a fiberglass based facer that is between about 15% and 25% by weight fiberglass mat and between about 75% and 85% by weight highly inorganic filled latex based coating material and has a Gurley porosity of at least 300 (Gurley porosity is the time in seconds for 100 cubic centimeters of air to pass through one square inch of a material). Preferably, the fiberglass-based facer of the subject invention has a structure for permitting a limited penetration of a polymeric or predominately polymeric material liquid mixture through the first major surface of the fiberglass-based facer into, but only part of the way through, the fiberglass-based facer when the fiberglass-based facer overlies the polymeric or predominately polymeric material liquid mixture during the formation of a roofing board from the polymeric or predominately polymeric material liquid mixture. Thus, a prefabricated faced roofing board composite is formed having a strong bond between the fiberglass-based facer and the roofing board without permitting the polymeric or predominately polymeric material liquid mixture to pass through the fiberglass-based facer to the first major surface of the fiberglass facer where the polymeric or predominately polymeric material liquid mixture could adversely affect both the manufacturing process and the desired physical characteristics of the prefabricated faced roofing board composite.

DESCRIPTION OF THE PREFERRED EMBODIMENTS

Figure 1:
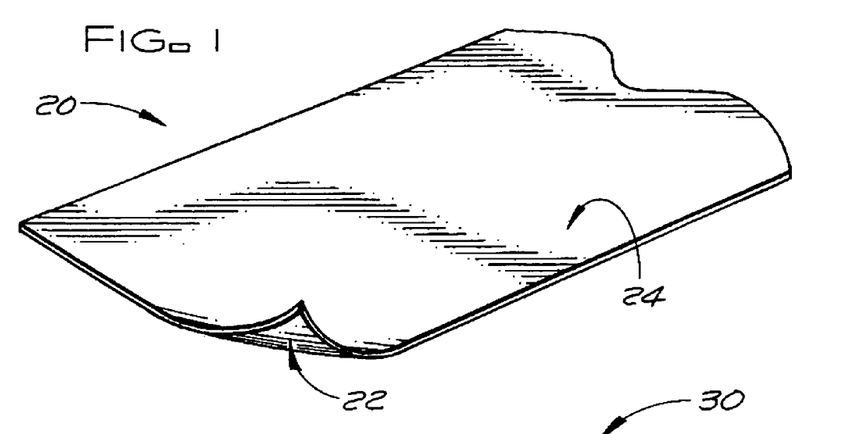
FIG. 1 is a schematic perspective view of a fiberglass-based facer of the subject invention for improving the fire resistance and weathering properties of a polymeric roofing board.

FIG. 1 shows a fiberglass-based facer 20 of the subject invention for improving the fire resistance and weathering properties of a roofing board or roofing board composite. The fire and weather resistant fiberglass-based facer 20 has a length, a width, and a thickness with first and second major surfaces 22 and 24 that are each defined by the length and the width of the fiberglass-based facer 20. The first major surface 22 of the fiberglass-based facer 20 is adapted to be bonded to a polymeric or predominately polymeric roofing board layer to form a roofing board composite incorporating the fiberglass-based facer 20 and the second major surface 24 of the fiberglass-based facer 20 is adapted to form an exposed surface of the roofing board composite.

Figure 10:
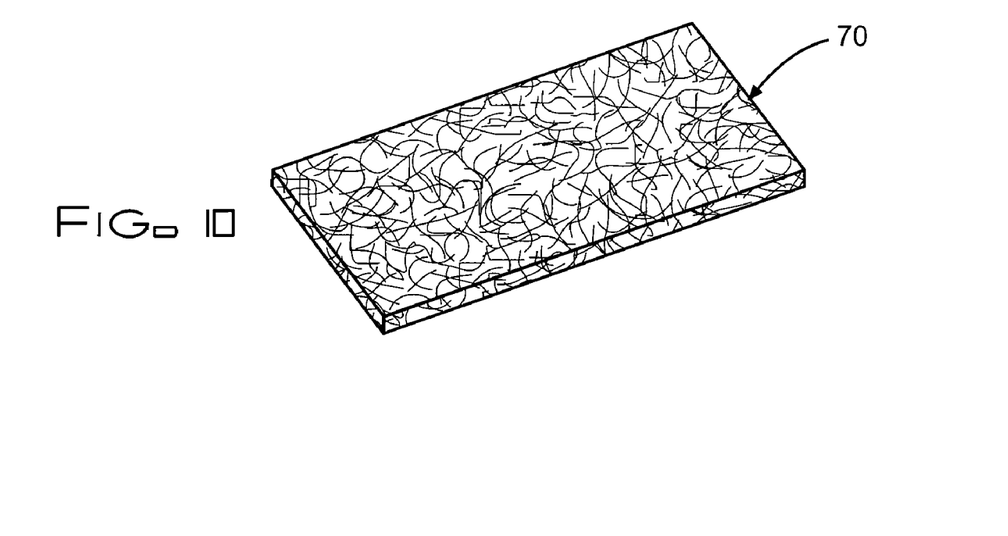
FIG. 10 is a schematic perspective view of a nonwoven fiberglass mat used in the facers of the subject invention wherein the fiberglass mat has interstices defined by the glass fibers.
Figure 11:
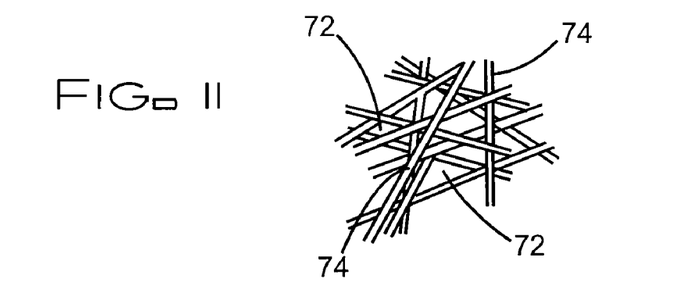
FIG. 11 is a view, greatly enlarged and directed at a small portion of a major surface of the nonwoven fiberglass mat of FIG. 10, to schematically illustrate interstices of the mat that are defined by the glass fibers of the mat.

The fiberglass-based facer 20 may be: a) a woven or nonwoven uncoated fiberglass mat alone, b) an uncoated woven or nonwoven fiberglass mat with a polymeric binder, c) an uncoated woven or nonwoven fiberglass mat with a polymeric binder containing one or more mineral fillers, d) an uncoated woven or nonwoven fiberglass mat with one or more mineral fillers, e) a coated woven or nonwoven fiberglass mat that is coated with a coating containing one or more mineral fillers and a mineral filler carrier (e.g. an organic binder or emulsion) applied to a major surface of the facer that is to be the exposed major surface of the facer, or f) any of facers a to d with a coating containing one or more mineral filler(s) and a mineral filler carrier (e.g. an organic binder or emulsion) applied to a major surface of the facer that is to be the exposed major surface of the facer. FIG. 10 is a schematic perspective view of a typical nonwoven fiberglass mat 70 used in the fiberglass-based facers 20 of the subject invention wherein the fiberglass mat has interstices 72 defined by the glass fibers 74 of the mat 70. FIG. 11 is a view, greatly enlarged and directed at a small portion of a major surface of the nonwoven fiberglass mat 70 of FIG. 10, to schematically illustrate interstices 72 of the mat that are defined by the glass fibers 74 of the mat.

Preferably, the fiberglass-based facer 20 has a Gurley porosity of at least 300. In a preferred embodiment of the fiberglass-based facer 20, the fiberglass-based facer includes a fiberglass mat 70 with a first major surface which forms the first major surface 22 of the facer and is adapted to overlay a major surface of a roofing board and a second major surface which is coated with a highly inorganic filled latex based coating material (limestone/latex coating mixture). The highly inorganic filled latex based coating material combines with the fiberglass mat to form a fiberglass based facer that is between about 15% and 25% by weight fiberglass mat and between about 75% and 85% by weight highly inorganic filled latex based coating material and has a Gurley porosity of at least 300. Preferably, the highly inorganic filled latex based coating material is incorporated into the fiberglass-based facer 20 at and adjacent the second major surface 24 of the fiberglass mat 70 of the facer and not at and adjacent the first major surface 22 of the fiberglass mat 70 of the facer for permitting a limited penetration of a liquid polymeric or predominately polymeric material used to form a roofing board layer through the first major surface 22 of the fiberglass-based facer 20 into, but only part of the way through, the fiberglass-based facer 20 when the fiberglass-based facer 20 overlies a liquid polymeric or predominately polymeric material during the formation of a polymeric roofing board from the liquid polymeric or predominately polymeric material to effect a strong bond between the fiberglass-based facer 20 and the polymeric roofing board thus formed without permitting the liquid polymeric or predominately polymeric material to pass through the fiberglass-based facer to the second major surface 24 of the facer.

Figure 12:
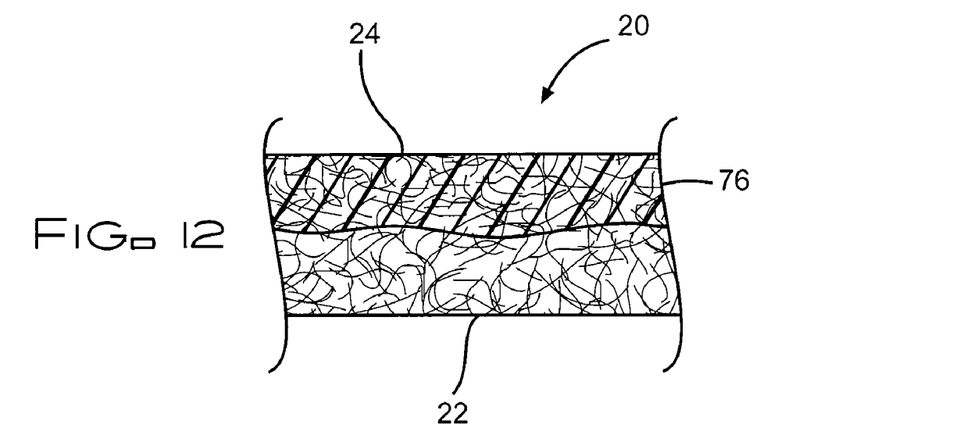
FIG. 12 is a schematic side view of a portion of the fiberglass-based facer of FIG. 1 showing one embodiment of that facer wherein a polymer based carrier is incorporated into the fiberglass mat of the fiberglass-based facer to fill the interstices of the fiberglass mat with the polymer based carrier at and adjacent one major surface of the facer's fiberglass mat and not at and adjacent the other major surface of the facer's fiberglass mat.

The fiberglass-based facer 20 is substantially impervious to the passage of hot gases of combustion, water, and water vapor through the thickness of the fiberglass-based facer. In addition, the fiberglass-based facer 20 has a structure for permitting a limited penetration of a polymeric or predominately polymeric liquid mixture through the first major surface 22 of the fiberglass-based facer into, but only part of the way through, the fiberglass-based facer when the fiberglass-based facer overlies the polymeric or predominately polymeric liquid mixture during the formation of a roofing board layer from the polymeric or predominately polymeric liquid mixture. Thus, a strong bond is formed between the fiberglass-based facer and the roofing board layer without permitting the polymeric or predominately polymeric liquid mixture to pass through the fiberglass-based facer to the second major surface 24 of the fiberglass-based facer 20.

Where the fiberglass-based facer is formed by an uncoated fiberglass mat alone, the glass fibers and/or filaments of the mat are so entangled and/or closely spaced with respect to each other that fiberglass mat is substantially impervious to the passage of hot gases of combustion, water, and water vapor through the thickness of the fiberglass mat and thus the fiberglass-based facer 20. In preferred embodiments of the fiberglass-based facer 20, the fiberglass mat may progressively increase in density from the major surface of the fiberglass mat that forms the first major surface 22 of the fiberglass-based facer 20 to the major surface of the fiberglass mat that forms the second major surface 24 of the fiberglass-based facer 20; the fiberglass mat may have a higher density at and adjacent the major surface of the fiberglass mat that forms the second major surface 24 of the fiberglass-based facer 20 than throughout a remainder of the mat thickness; or the fiberglass mat may have a lower density at and adjacent the major surface of the fiberglass mat that forms the first major surface 22 of the fiberglass-based facer 20 than throughout a remainder of the mat thickness. These facer structures facilitate a limited penetration of a polymeric or predominately polymeric liquid mixture through the first major surface 22 of the fiberglass-based facer 20 into, but only part of the way through, the fiberglass-based facer 20 when the fiberglass-based facer 20 overlies the polymeric or predominately polymeric liquid mixture during the formation of a roofing board layer from the polymeric or predominately polymeric liquid mixture. Thus, a strong bond is formed between the fiberglass-based facer and the roofing board layer without permitting the polymeric or predominately polymeric liquid mixture to pass through the fiberglass-based facer to the second major surface 24 of the fiberglass-based facer 20 where the polymeric or predominately polymeric liquid mixture could adversely affect the manufacturing process and/or the physical characteristics of the resulting faced roofing board composite.

Where the fiberglass-based facer 20 is formed by an uncoated fiberglass mat and a polymeric binder, a polymeric binder containing mineral filler(s), or mineral filler(s), the glass fibers and/or filaments of the mat are so entangled and/or closely spaced with respect to each other and the interstices of the fiberglass mat are so filled with the polymeric binder, the polymeric binder containing mineral filler(s), or the mineral fillers that the fiberglass mat with the polymeric binder, the polymeric binder containing mineral filler(s) or the mineral filler(s) is substantially impervious to the passage of hot gases of combustion, water, and water vapor through the thickness of the fiberglass mat and thus the fiberglass-based facer 20. In preferred embodiments of the fiberglass-based facer 20, the polymeric binder, the polymeric binder containing mineral filler(s) or the mineral filler(s) may be incorporated into the fiberglass mat at and adjacent the major surface of the fiberglass mat that forms the second major surface 24 of the fiberglass-based facer 20 rather than throughout the thickness of the fiberglass mat or the polymeric binder, the polymeric binder containing mineral filler(s) or the mineral filler(s) may be incorporated throughout the thickness of the mat except at and adjacent the major surface of the fiberglass mat that forms the first major surface 22 of the fiberglass-based facer 20. This facer structure facilitates the limited penetration of a polymeric or predominately polymeric liquid mixture through the first major surface 22 of the fiberglass-based facer into, but only part of the way through, the fiberglass-based facer 20 when the fiberglass-based facer 20 overlies the polymeric or predominately polymeric liquid mixture during the formation of a roofing board layer from the polymeric or predominately polymeric liquid mixture. Thus, a strong bond is formed between the fiberglass-based facer and the roofing board layer without permitting the polymeric or predominately polymeric liquid mixture to pass through the fiberglass-based facer to the second major surface 24 of the fiberglass-based facer 20 where the polymeric or predominately polymeric liquid mixture could adversely affect the manufacturing process and/or the physical characteristics of the resulting faced roofing board composite. A mineral filler such as but not limited to calcium carbonate, mica, talc, and silica or blends of these mineral fillers may be used as the mineral filler(s) and the mineral fillers may be bonded to the fiberglass mat with inorganic adhesive materials. The polymeric binder, polymeric binder with mineral filler(s) or mineral filler(s) may be applied by any normal and established application technique.

Where the fiberglass-based facer 20 is formed by an uncoated fiberglass mat 70 and a polymeric binder, a polymeric binder containing mineral filler(s), or mineral filler(s) 76, the glass fibers and/or filaments 74 of the mat 70 are so entangled and/or closely spaced with respect to each other and the interstices 72 of the fiberglass mat are so filled with the polymeric binder, the polymeric binder containing mineral filler(s), or the mineral fillers 76 that the fiberglass mat 70 with the polymeric binder, the polymeric binder containing mineral filler(s) or the mineral filler(s) 76 is substantially impervious to the passage of hot gases of combustion, water, and water vapor through the thickness of the fiberglass mat 70 and thus the fiberglass-based facer 20. In preferred embodiments of the fiberglass-based facer 20, as shown in FIG. 12, the polymeric binder, the polymeric binder containing mineral filler(s) or the mineral filler(s) 76 may be incorporated into the fiberglass mat 70 at and adjacent the major surface of the fiberglass mat that forms the second major surface 24 of the fiberglass-based facer 20 rather than throughout the thickness of the fiberglass mat 70 or the polymeric binder, the polymeric binder containing mineral filler(s) or the mineral filler(s) 76 may be incorporated throughout the thickness of the mat except at and adjacent the major surface of the fiberglass mat 70 that forms the first major surface 22 of the fiberglass-based facer 20. This facer structure facilitates the limited penetration of a polymeric or predominately polymeric liquid mixture used to form a roofing board layer through the first major surface 22 of the fiberglass-based facer 20 into, but only part of the way through, the fiberglass-based facer 20 when the fiberglass-based facer 20 overlies the polymeric or predominately polymeric liquid mixture during the formation of a roofing board layer from the polymeric or predominately polymeric liquid mixture. Thus, a strong bond is formed between the fiberglass-based facer 20 and the roofing board layer without permitting the polymeric or predominately polymeric liquid mixture forming the roofing board layer to pass through the fiberglass-based facer 20 to the second major surface 24 of the fiberglass-based facer 20 where the polymeric or predominately polymeric liquid mixture could adversely affect the manufacturing process and/or the physical characteristics of the resulting faced roofing board composite. A mineral filler such as but not limited to calcium carbonate, mica, talc, and silica or blends of these mineral fillers may be used as the mineral filler(s) and the mineral fillers may be bonded to the fiberglass mat with inorganic adhesive materials. The polymeric binder, polymeric binder with mineral filler(s) or mineral filler(s) may be applied by any normal and established application technique.

The fiberglass-based facer 20 may be applied to various single or multi-layer roofing boards to form prefabricated faced roofing board composites that are more fire and weather resistant. For example, a fiberglass-based facer 20 can be applied to one major surface or fiberglass-based facers 20 can be applied to both major surfaces of a roofing cover board; a fiberglass-based facer 20 can be applied to one major surface or fiberglass-based facers 20 can be applied to both major surfaces of a roofing insulation board; a fiberglass-based facer 20 can be applied to one major surface or fiberglass-based facers 20 can be applied to both major surfaces of high density and low density polymeric or predominately polymeric material roofing board composite (e.g. a cover board and insulation board composite or a cover board, insulation board, and baseboard composite); and a fiberglass-based facer 20 can be applied to one major surface or fiberglass-based facers 20 can be applied to both major surfaces of multi-layer polymeric or predominately polymeric material roofing board composite where at least two of the polymeric or predominately polymeric material layers of the composite differ from each other (e.g. have densities, compositions, or densities and compositions that differ from each other). In addition, where a fiberglass-based facer 20 is applied to one major surface of a single or multi-layer roofing board to form a faced roofing board composite that is more fire and weather resistant, the other major surface of the roofing board may be overlaid with a different type of facer, e.g. a non-fiberglass-based facer or a facer having different physical characteristics or properties.

Figure 2:
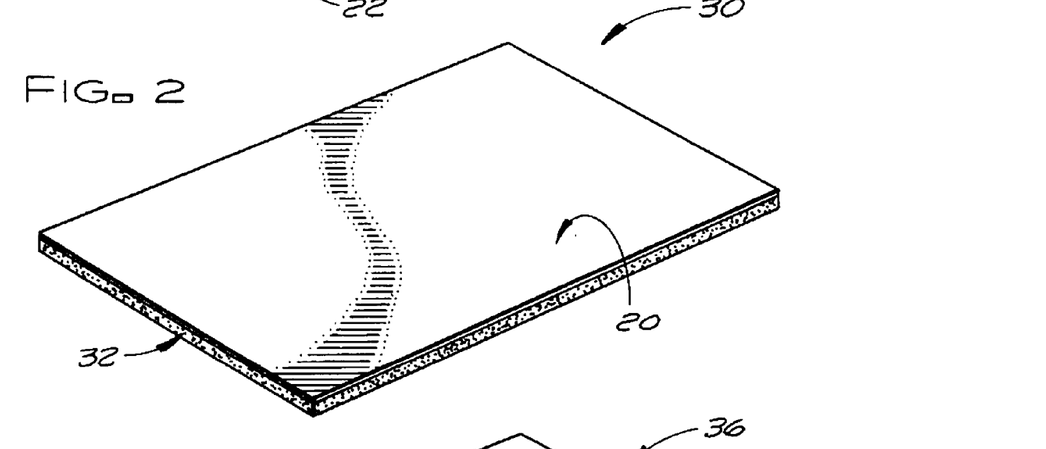
FIG. 2 is a schematic perspective view of a prefabricated faced roofing board composite of the subject invention that includes a high-density polymer or predominantly polymer material cover board with a fiberglass-based facer overlying the top major surface of the cover board.

FIG. 2 is a schematic perspective view of a prefabricated faced roofing board composite 30 of the subject invention. The prefabricated faced roofing board composite 30 is a faced roofing cover board composite with a high-density polymer or predominantly polymer material or foam material core layer 32 and a fiberglass-based facer 20 overlying and bonded to the top major surface of the high-density polymer or predominantly polymer material or foam material core layer 32. The fiberglass-based facer 20 may be substantially coextensive with, coextensive with, or extend beyond the major surface of the core layer 32 to which the fiberglass-based facer 20 is bonded along the length(s) of any one, two, or three edges of the core layer 32 or along the lengths of all four edges of the core layer 32 to overlap and be bonded to other roofing cover board composites.

Preferably, the high-density polymer or predominantly polymer material or foam material core layer 32 of the faced roofing cover board composite 30 has a density or an average density between 6 lbs/ft$^3$ and 25 lbs/ft$^3$ and more preferably a density or an average density of at least 8 lbs/ft$^3$. Typically, the high-density polymer or predominantly polymer material or foam core layer 32 of the faced roofing cover board composite 30 has a width of about four feet or greater and a length of about four feet or greater, preferably, about eight feet or greater, and could have lengths that are limited only by the ability to store, transport, and handle the faced roofing cover board composite 30 prior to installation. Preferably, the high-density polymer or predominantly polymer material or foam material core layer 32 of the faced roofing cover board composite 30 has a thickness of about 0.08 inches or greater and more preferably a thickness between about 0.08 inches and about 0.75 inches. The density and thickness of the high-density polymer or predominantly polymer material or foam material core layer 32 of the faced roofing cover board composite 30 are selected to provide the faced roofing cover board composite 30 with the compressive strength to resist deformation and protect low-density insulation layers overlaid by the faced roofing cover board composite from damage. For example, the polymer or predominantly polymer material core layer 32 may vary in density throughout the thickness of the core layer with the core layer progressively increasing in density from its bottom major surface to its top major surface.

The high-density polymer or predominantly polymer material or foam material core layer 32 of the faced roofing cover board composite 30 may be made of various high-density polymer or predominantly polymer materials [e.g. a high-density polyisocyanurate, polyurethane, polystyrene, or phenolic material or a high-density material made of a blend of these materials; a high-density polyisocyanurate, polyurethane, polystyrene, or phenolic foam material or a high-density foam material made of a blend of these materials; a high-density predominantly polyisocyanurate, polyurethane, polystyrene, or phenolic material with inorganic filler(s) or a high-density material made of a blend of these materials with filler(s); a high-density predominantly polyisocyanurate, polyurethane, polystyrene, or phenolic foam material with inorganic filler(s) or a high-density foam material made of a blend of these materials with filler(s), a high-density material made of other thermoset matrix polymers; etc.]. However, a preferred material for the high-density core layer 32 is a high-density polyisocyanurate or predominantly polyisocyanurate material or foam material. The predominantly polymer materials of the high-density core layer 32 may contain various powdered and liquid fillers, fiber reinforcements, fungi growth-inhibiting agents, and fire-retardants to reduce the cost of and/or modify the properties of the high-density core layer 32, such as but not limited to the compressive strength, the toughness, the flexibility, the friability, and the fire resistance of the core layer. Examples of fillers that may be used in the high-density predominantly polymer material core layer 32 are fillers such as limestone ($CaCO_3$), fiberglass, recycled polyisocyanurate dust, and extenders/plasticizers.

Figure 3:
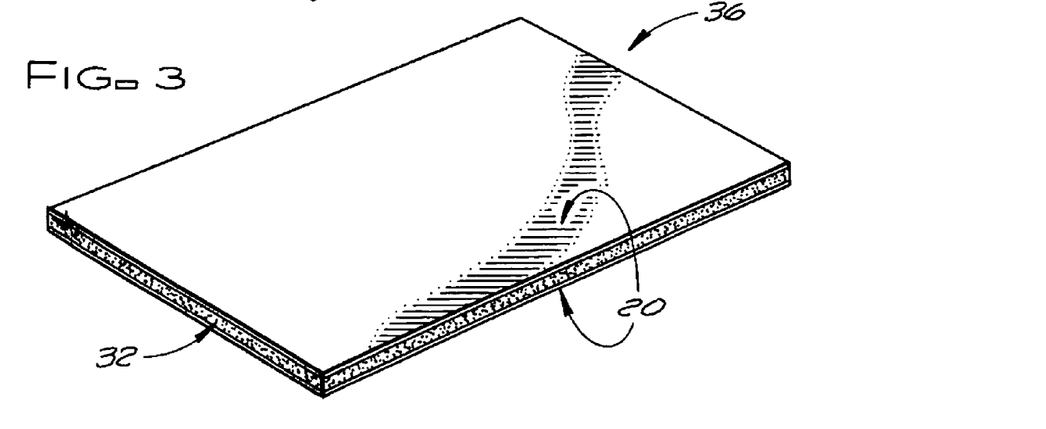
FIG. 3 is a schematic perspective view of a prefabricated faced roofing board composite of the subject invention that includes a high-density polymer or predominantly polymer material cover board with a fiberglass-based facer overlying the top major surface of the cover board and a fiberglass-based or other facer overlying the bottom major surface of the cover board.

FIG. 3 is a schematic perspective view of a prefabricated faced roofing board composite 36 of the subject invention. The prefabricated faced roofing board composite 36 is a faced roofing cover board composite with a high-density polymer or predominantly polymer material or foam material core layer 32 and fiberglass-based facers 20 overlying and bonded to each major surface of the high-density polymer or predominantly polymer material or foam material core layer 32. Either or both of the fiberglass-based facers 20 may be substantially coextensive with, coextensive with, or extend beyond the major surface of the core layer 32 to which the fiberglass-based facer 20 is bonded along the length(s) of any one, two, or three edges of the core layer 32 or along the lengths of all four edges of the core layer 32 to overlap and be bonded to other roofing cover board composites. Other than having fiberglass-based facers 20 that overlie and are bonded to both major surfaces of the high-density polymer or predominantly polymer material or foam material core layer 32, the faced roofing cover board composite 36 is the same as the faced roofing cover board composite 30.

Figure 4:
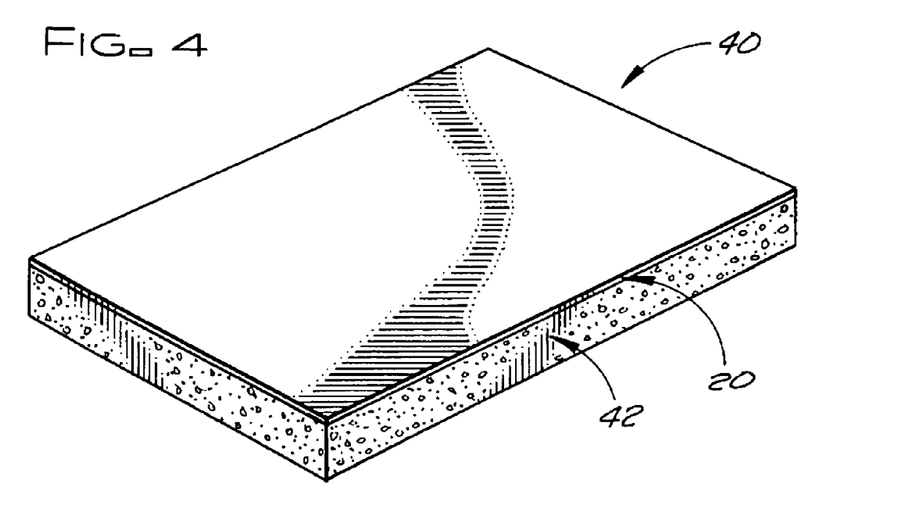
FIG. 4 is a schematic perspective view of a prefabricated faced roofing board composite of the subject invention that includes a low-density polymer or predominantly polymer material foam insulation board with a fiberglass-based facer overlying the top major surface of the insulation board.

FIG. 4 is a schematic perspective view of a prefabricated faced roofing board composite 40 of the subject invention. The prefabricated faced roofing board composite 40 is a faced roofing insulation board composite with a low-density polymer or predominantly polymer material foam core layer 42 and a fiberglass-based facer 20 that overlies and is bonded to the top major surface of the low-density polymer or predominantly polymer material foam core layer 42. The fiberglass-based facer 20 may be substantially coextensive with, coextensive with, or extend beyond the major surface of the core layer 42 to which the fiberglass-based facer 20 is bonded along the length(s) of any one, two, or three edges of the core layer 42 or along the lengths of all four edges of the core layer 42 to overlap and be bonded to other roofing insulation board composites 40.

Preferably, the low-density polymer or predominantly polymer material foam core layer 42 of the faced roofing insulation board composite 40 has a density or an average density of less than 6 lbs/ft³, preferably less than 4 lbs/ft³, and typically a density or an average density between about 1 lbs/ft³ and about 3 lbs/ft³. Typically, the low-density polymer or predominantly polymer material foam core layer 42 of the faced roofing insulation board composite 40 has a width of about four feet or greater and a length of about four feet or greater, preferably, about eight feet or greater, and could have lengths that are limited only by the ability to store, transport, and handle the faced roofing insulation board composite 40 prior to installation. Preferably, the low-density polymer or predominantly polymer material foam core layer 42 of the faced roofing insulation board composite 40 has a thickness of about 0.50 inches or greater and more preferably a thickness between about 0.50 inches and about 6 inches. The density and thickness of the low-density polymer or predominantly polymer material foam core layer 42 of the faced roofing insulation board composite 40 are selected to provide the faced roofing insulation board composite 40 with the desired insulating properties for the roofing system application. For example, the polymer or predominantly polymer material core layer 42 may vary in density throughout the thickness of the core layer with the core layer progressively increasing in density from its bottom major surface to its top major surface.

The low-density polymer or predominantly polymer material foam core layer 42 of the faced roofing insulation board 40 may be made of various low-density polymer or predominantly polymer foam materials [e.g. a low-density polyisocyanurate, polyurethane, polystyrene, or phenolic foam material or a low-density foam material made of a blend of these materials; a low-density predominantly polyisocyanurate, polyurethane, polystyrene, or phenolic foam material with inorganic filler(s) or a low-density foam material made of a blend of these materials with filler(s), a low-density foam material made of other thermoset matrix polymers; etc.]. However, a preferred material for the low-density core layer 42 is a low-density polyisocyanurate or predominantly polyisocyanurate foam material.

Figure 5:
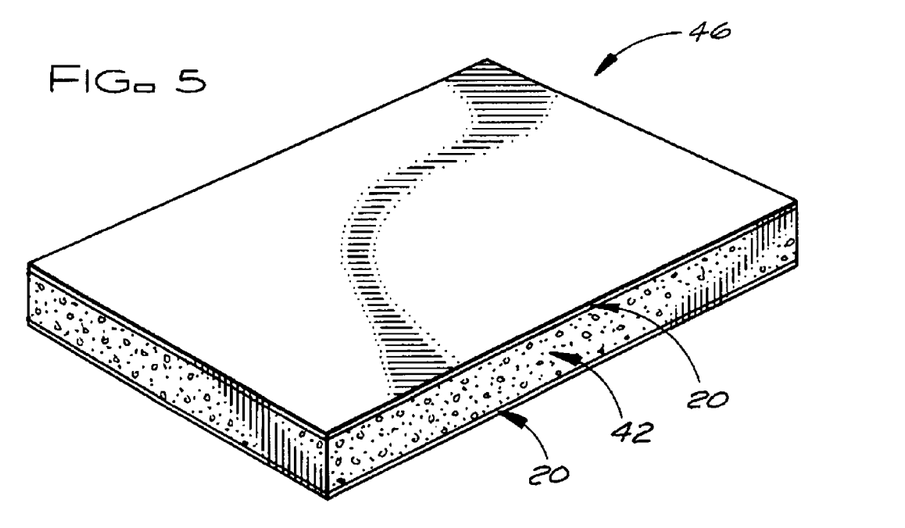
FIG. 5 is a schematic perspective view of a prefabricated faced roofing board composite of the subject invention that includes a low-density polymer or predominantly polymer material foam insulation board with a fiberglass-based facer overlying the top major surface of the insulation board and a fiberglass-based or other facer overlying the bottom major surface of the insulation board.

FIG. 5 is a schematic perspective view of a prefabricated faced roofing board composite 46 of the subject invention. The prefabricated faced roofing board composite 46 is a faced roofing insulation board composite with a low-density polymer or predominantly polymer material foam core layer 42 and fiberglass-based facers 20 overlying and bonded to each major surface of the low-density polymer or predominantly polymer material foam core layer 42. Either or both of the fiberglass-based facers 20 may be substantially coextensive with, coextensive with, or extend beyond the major surface of the core layer 42 to which the fiberglass-based facer 20 is bonded along the length(s) of any one, two, or three edges of the core layer 42 or along the lengths of all four edges of the core layer 42 to overlap and be bonded to other roofing insulation board composites. Other than having fiberglass-based facers 20 that overlie and are bonded to both major surfaces of the low-density polymer or predominantly polymer material foam core layer 42, the faced roofing insulation board composite 46 is the same as the faced roofing insulation board composite 40.

Figure 6:
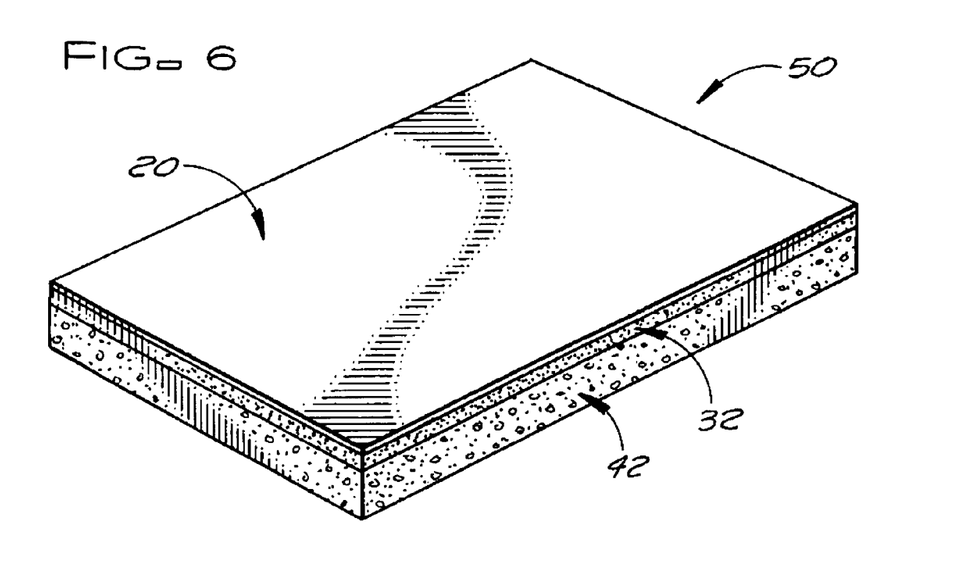
FIG. 6 is a schematic perspective view of a prefabricated faced roofing board composite of the subject invention that includes two polymeric or predominantly polymeric material layers that differ from each other in density, composition, density and composition, or otherwise physically and/or chemically differ from each other (such as a high-density polymer or predominantly polymer material cover board and a low-density polymer or predominantly polymer material foam insulation board) with a fiberglass-based facer overlying the top major surface of the roofing board composite.

FIG. 6 is a schematic perspective view of a prefabricated faced roofing board composite 50 of the subject invention. The prefabricated faced roofing board composite 50 includes a high-density polymer or predominantly polymer material or foam material core layer 32, a low-density polymer or predominantly polymer material foam core layer 42 that are bonded together, and fiberglass-based facer 20 that overlies and is bonded to a top major surface of the core layer 32. The fiberglass-based facer 20 may be substantially coextensive with, coextensive with, or extend beyond the major surface of the core layer 32 to which the fiberglass-based facer 20 is bonded along the length(s) of any one, two, or three edges of the core layer 32 or along the lengths of all four edges of the core layer 32 to overlap and be bonded to other roofing board composites. The prefabricated faced roofing board composite 50 typically has a width of about four feet or greater and a length of about four feet or greater, preferably, about eight feet or greater and could have lengths that are limited only by the ability to store, transport and handle the faced roofing board composite prior to installation.

Preferably, the high-density polymer or predominantly polymer material or foam material core layer 32 of the faced roofing board composite 50 has a density or an average between 6 lbs/ft³ and 25 lbs/ft³ and more preferably a density or average density of at least 8 lbs/ft³. Preferably, the high-density polymer or predominantly polymer material or foam material core layer 32 of the faced roofing board composite 50 has a thickness of about 0.08 inches or greater and more preferably a thickness between about 0.08 inches and about 0.75 inches. The density and thickness of the high-density polymer or predominantly polymer material or foam material core layer 32 of the faced roofing board composite 30 are selected to provide the roofing core layer 32 with the compressive strength to resist deformation and protect low-density insulation core layer 42 of the composite that is overlaid by the core layer 32. The high-density polymer or predominantly polymer material or foam material core layer 32 of the faced roofing board composite 50 may be made of the same high-density polymer or predominantly polymer materials as the core layer 32 of the faced roofing cover board composite 30.

Preferably, the low-density polymer or predominantly polymer material foam core layer 42 of the faced roofing board composite 50 has a density or average density of less than 6 lbs/ft³, preferably less than 4 lbs/ft³, and typically a density or an average density between about 1 lbs/ft³ and about 3 lbs/ft³. Preferably, the low-density polymer or predominantly polymer material foam core layer 42 of the faced roofing board composite 50 has a thickness of about 0.50 inches or greater and more preferably a thickness between about 0.50 inches and about 6 inches. The density and thickness of the low-density polymer or predominantly polymer material foam core layer 42 of the faced roofing board composite 50 are selected to provide the faced roofing board composite 50 with the desired insulating properties for the roofing system application. The low-density polymer or predominantly polymer material core layer 42 of the roofing board composite 50 may be made of the same low-density polymer or predominantly polymer materials as the core layer 42 of the roofing insulation board composite 40.

Figure 7:
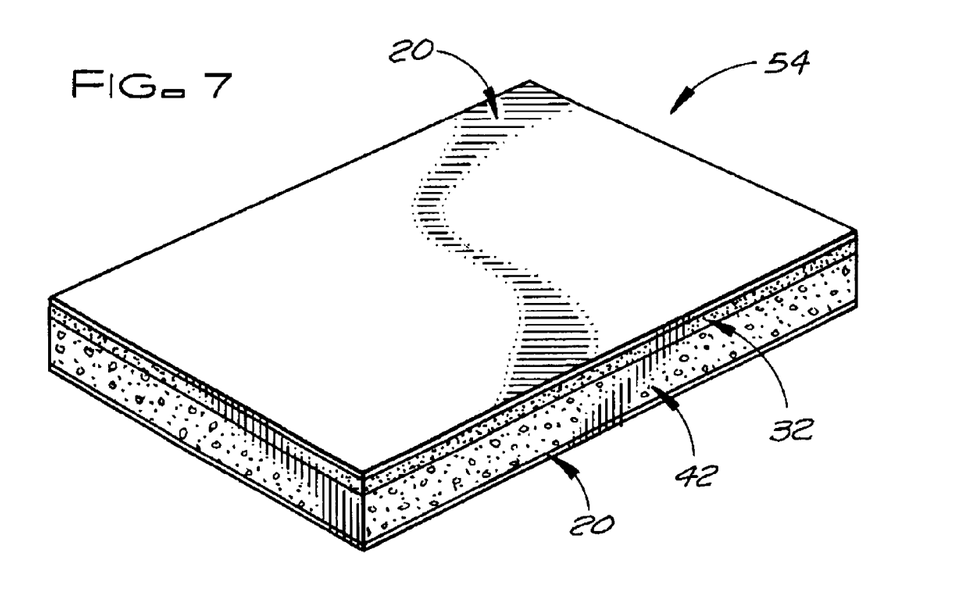
FIG. 7 is a schematic perspective view of a prefabricated faced roofing board composite of the subject invention that includes two polymeric or predominantly polymeric material layers that differ from each other in density, composition, density and composition, or otherwise physically and/or chemically differ from each other (such as a high-density polymer or predominantly polymer material cover board and a low-density polymer or predominantly polymer material foam insulation board) with a fiberglass-based facer overlying the top major surface of the roofing board composite and a fiberglass-based or other facer overlying the bottom major surface of the roofing board composite.

FIG. 7 is a schematic perspective view of a prefabricated faced roofing board composite 54 of the subject invention. The prefabricated faced roofing board composite 54 includes a high-density polymer or predominantly polymer material or foam material core layer 32, a low-density polymer or predominantly polymer material foam core layer 42 that are bonded together, a fiberglass-based facer 20 that overlies and is bonded to a top major surface of the core layer 32, and a fiberglass-based facer 20 that overlies and is bonded to a bottom major surface of the core layer 42. The fiberglass-based facers 20 may be substantially coextensive with, coextensive with, or extend beyond the major surface of the core layer 32 or 42 to which the fiberglass-based facer 20 is bonded along the length(s) of any one, two, or three edges of the core layer or along the lengths of all four edges of the core layer to overlap and be bonded to other roofing board composites. Other than having fiberglass-based facers 20 that overlie and are bonded to both the top major surface of the core layer 32 and the bottom major surface of the core layer 42 instead of just the top major surface of the core layer 32, the faced roofing board composite 54 is the same as the faced roofing board composite 50.

Figure 8:
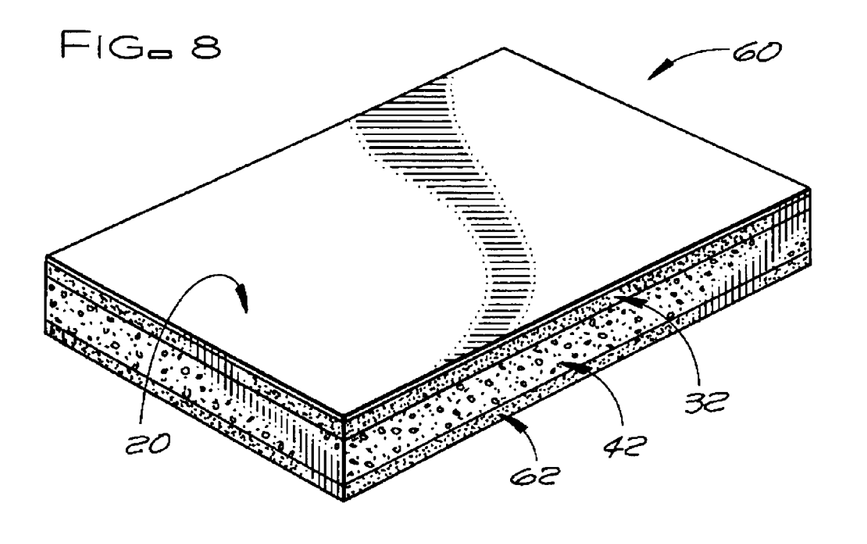
FIG. 8 is a schematic perspective view of a prefabricated faced roofing board composite of the subject invention that includes three polymeric or predominantly polymeric material layers wherein at least two of the layers differ from each other in density, composition, density and composition, or otherwise physically and/or chemically differ from each other (such as a high-density polymer or predominantly polymer material cover board, a low-density polymer or predominantly polymer material foam insulation board, and a high-density polymer or predominantly polymer material baseboard) with a fiberglass-based facer overlying the top major surface of the roofing board composite.

FIG. 8 is a schematic perspective view of a prefabricated faced roofing board composite 60 of the subject invention. The prefabricated faced roofing board composite 60 includes: a high-density polymer or predominantly polymer material or foam material core layer 32 that forms a cover board layer of the composite, a low-density polymer or predominantly polymer material foam core layer 42 that forms an insulation board layer of the composite, a high-density polymer or predominantly polymer material or foam material layer 62 that forms a baseboard layer of the composite, and a fiberglass-based facer 20 that overlies and is bonded to the top major surface of the core layer 32. The core layer 42 is intermediate and bonded to both the core layer 32 and the core layer 62. The fiberglass-based facer 20 may be substantially coextensive with, coextensive with, or extend beyond the major surface of the core layer 32 to which the fiberglass-based facer 20 is bonded along the length(s) of any one, two, or three edges of the core layer 32 or along the lengths of all four edges of the core layer 32 to overlap and be bonded to other roofing board composites. The prefabricated faced roofing board composite 60 typically has a width of about four feet or greater and a length of about four feet or greater, preferably, about eight feet or greater and could have lengths that are limited only by the ability to store, transport and handle the roofing board composite prior to installation.

Preferably, the high-density polymer or predominantly polymer material or foam material core layers 32 and 62 of the faced roofing board composite 60 have a density or an average density between 6 lbs/ft³ and 25 lbs/ft³ and more preferably a density or an average density of at least 8 lbs/ft³. Preferably, the high-density polymer or predominantly polymer material or foam material core layers 32 and 62 of the faced roofing board composite 60 each have a thickness of about 0.08 inches or greater and more preferably a thickness between about 0.08 inches and about 0.75 inches. The density and thickness of the high-density polymer or predominantly polymer material or foam material core layers 32 and 62 of the faced roofing board composite 60 are selected to provide the core layers 32 and 62 with the compressive strength to resist deformation and protect low-density insulation core layer 42 of the composite that located between the core layers 32 and 42. The high-density polymer or predominantly polymer material or foam material core layers 32 and 62 of the faced roofing board composite 60 may be made of the same high-density polymer or predominantly polymer materials as the core layer 32 of the faced roofing cover board composite 30. The high-density polymer or predominantly polymer material or foam material core layers 32 and 62 of the faced roofing board composite 60 may have the same or different densities.

Preferably, the low-density polymer or predominantly polymer material foam core layer 42 of the faced roofing board composite 60 has a density or an average density of less than 6 lbs/ft³, preferably less than 4 lbs/ft³, and typically a density or an average density between about 1 lbs/ft³ and about 3 lbs/ft³. Preferably, the low-density polymer or predominantly polymer material foam core layer 42 of the faced roofing board composite 60 has a thickness of about 0.50 inches or greater and more preferably a thickness between about 0.50 inches and about 6 inches. The density and thickness of the low-density polymer or predominantly polymer material foam core layer 42 of the faced roofing board composite 60 are selected to provide the faced roofing board composite 60 with the desired insulating properties for the roofing system application. The low-density polymer or predominantly polymer material foam core layer 42 of the faced roofing board composite 60 may be made of the same low-density polymer or predominantly polymer materials as the core layer 42 of the faced roofing insulation board composite 40.

Figure 9:
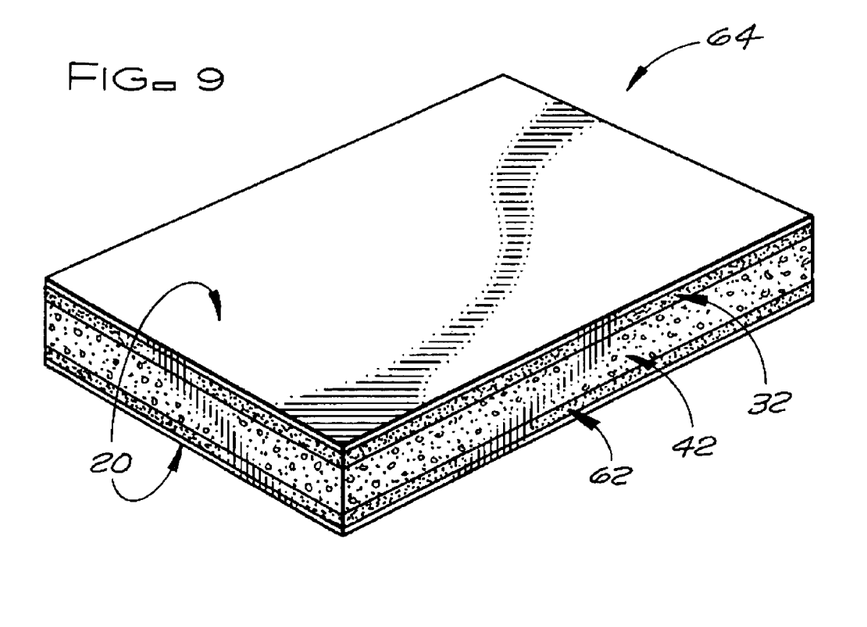
FIG. 9 is a schematic perspective view of a prefabricated faced roofing board composite of the subject invention that includes three polymeric or predominantly polymeric material layers wherein at least two of the layers differ from each other in density, composition, density and composition, or otherwise physically and/or chemically differ from each other (such as a high-density polymer or predominantly polymer material cover board, a low-density polymer or predominantly polymer material foam insulation board, and a high-density polymer or predominantly polymer material baseboard) with a fiberglass-based facer overlying the top major surface of the composite and a fiberglass-based or other facer overlying the bottom major surface of the composite.

FIG. 9 is a schematic perspective view of a prefabricated faced roofing board composite 64 of the subject invention.

The prefabricated faced roofing board composite 64 includes: a high-density polymer or predominantly polymer material or foam material core layer 32 that forms a cover board layer of the composite, a low-density polymer or predominantly polymer material foam core layer 42 that forms an insulation board layer of the composite, a high-density polymer or predominantly polymer material or foam material core layer 62 that forms a baseboard layer of the composite, a fiberglass-based facer 20 that overlies and is bonded to the top major surface of the core layer 32, and a fiberglass-based facer 20 that overlies and is bonded to the bottom major surface of the core layer 62. The core layer 42 is intermediate and bonded to both the core layer 32 and the core layer 62. The fiberglass-based facers 20 may be substantially coextensive with, coextensive with, or extend beyond the major surfaces of the core layer 32 or 62 to which the fiberglass-based facer 20 is bonded along the length(s) of any one, two, or three edges of the core layer or along the lengths of all four edges of the core layer to overlap and be bonded to other roofing board composites. Other than having fiberglass-based facers 20 that overlie and are bonded to both the top major surface of the core layer 32 and the bottom major surface of the core layer 62 instead of just the top major surface of the core layer 32, the faced roofing board composite 64 is the same as the faced roofing board composite 60.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. For example, any of the fiberglass-based facers 20 of the subject invention may be used as a facer or facers for a roofing board composite wherein there is only one polymeric or predominantly polymeric material layer that progressively increases in density from its bottom major surface to its top major surface and has an average density between about 1.2 and about 25 lbs/ft³ e.g. a prefabricated faced roofing board composite wherein the polymeric or predominantly polymeric material layer forms a combined cover and insulation board of the faced roofing board composite. Thus, the invention is not intended to be limited to the specific embodiments disclosed, but is to be limited only by the claims appended hereto.

What is claimed is:

1. A facer for improving the fire resistance and weathering properties of a polymeric material roofing board, comprising:
    a fire and weather resistant fiberglass-based facer having a length, a width, and a thickness; the fiberglass-based facer having first and second major surfaces that are each defined by the length and the width of the fiberglass-based facer; the fiberglass-based facer comprising a fiberglass mat having a Gurley Porosity of at least 300 and being substantially impervious to a passage of hot gases of combustion and water vapor through the thickness of the fiberglass-based facer; and the fiberglass-based facer having a structure for permitting a limited penetration of a liquid polymeric mixture through the first major surface of the fiberglass-based facer into, but only part the way through, the fiberglass-based facer when the fiberglass-based facer overlies the liquid polymeric mixture during the formation of a polymeric roofing board from the liquid polymeric mixture to effect a strong bond between the fiberglass-based facer and the polymeric roofing board thus formed without permitting the liquid polymeric mixture to pass through the fiberglass-based facer to the second major surface.

2. The facer for improving the fire resistance and weathering properties of a polymeric material roofing board according to claim 1, wherein:
    the fiberglass-based facer being an uncoated fiberglass mat that is substantially impervious to the passage of hot gases of combustion and water vapor.

3. The facer for improving the fire resistance and weathering properties of a polymeric material roofing board according to claim 1, wherein:
    the fiberglass-based facer comprises an uncoated fiberglass mat with mineral filler that combine to make the fiberglass-based facer substantially impervious to the passage of hot gases of combustion and water vapor.

4. The facer for improving the fire resistance and weathering properties of a polymeric material roofing board according to claim 1, wherein:
    the fiberglass-based facer comprises an uncoated fiberglass mat with a polymeric binder that combine to make the fiberglass-based facer substantially impervious to the passage of hot gases of combustion and water vapor.

5. The facer for improving the fire resistance and weathering properties of a polymeric material roofing board according to claim 1, wherein:
    the fiberglass-based facer comprises an uncoated fiberglass mat with mineral filler and a mineral filler carrier that combine to make the fiberglass-based facer substantially impervious to the passage of hot gases of combustion and water vapor.

6. The facer for improving the fire resistance and weathering properties of a polymeric material roofing board according to claim 1, wherein:
    the fiberglass-based facer comprises a fiberglass mat coated on the second major surface with a coating that contains mineral filler and a mineral filler carrier which combine to make the fiberglass-based facer substantially impervious to the passage of hot gases of combustion and water vapor.

7. A prefabricated, faced roofing board composite, comprising:
    a first board layer made of a polymeric material or a predominantly polymeric material; and a first fiberglass-based facer that is fire and weather resistant;
    the first board layer having a density, a length, a width, and a thickness; the polymeric material or predominately polymeric material of the first board layer having an average density between about 1.2 lbs/ft³ and about 25 lbs/ft³; the first board layer having a top major surface and a bottom major surface that are each defined by the length and the width of the first board layer;
    the first fiberglass-based facer comprising a fiberglass mat and having a length, a width, and a thickness; the first fiberglass-based facer having first and second major surfaces that are each defined by the length and the width of the first fiberglass-based facer; the first fiberglass-based facer having a Gurley porosity of at least 300 and being substantially impervious to a passage of hot gases of combustion and water vapor through the thickness of the first fiberglass-based facer; and
    the first fiberglass-based facer being substantially coextensive with and bonded to the top major surface of the first board layer; and the polymeric material or predominantly polymeric material of the first board layer penetrating part way through, but not completely through, the first fiberglass-based facer from the first major surface of the first fiberglass-based facer to effect a strong bond between the first fiberglass-based facer and the top major surface of the first board layer while the second major surface of the first fiberglass-based facer is free of the polymeric material or predominantly polymeric material of the first board layer.

8. The prefabricated, faced roofing board composite according to claim 7, wherein:
the first fiberglass-based facer is an uncoated fiberglass mat that is substantially impervious to the passage of hot gases of combustion and water vapor.

9. The prefabricated, faced roofing board composite according to claim 7, wherein:
the first fiberglass-based facer comprises an uncoated fiberglass mat with mineral filler that combine with the fiberglass mat to make the first fiberglass-based facer substantially impervious to the passage of hot gases of combustion and water vapor.

10. The prefabricated, faced roofing board composite according to claim 7, wherein:
the first fiberglass-based facer comprises an uncoated fiberglass mat with a polymeric binder that combine with the fiberglass mat to make the first fiberglass-based facer substantially impervious to the passage of hot gases of combustion and water vapor.

11. The prefabricated, faced roofing board composite according to claim 7, wherein:
the first fiberglass-based facer comprises an uncoated fiberglass mat with a mineral filler and a mineral filler carrier that combine with the fiberglass mat to make the first fiberglass-based facer substantially impervious to the passage of hot gases of combustion and water vapor.

12. The prefabricated, faced roofing board composite according to claim 7, wherein:
the first fiberglass-based facer comprises a fiberglass mat coated on the second major surface with a coating that contains mineral filler and a mineral filler carrier which combine with the fiberglass mat to make the first fiberglass-based facer substantially impervious to the passage of hot gases of combustion and water vapor.

13. The prefabricated, faced roofing board composite according to claim 7, wherein:
the polymeric material or predominately polymeric material of the first board layer has an average density between 6 lbs/ft$^3$ and 25 lbs/ft$^3$ and the thickness is at least 0.08 inches; the polymeric material or predominately polymeric material of the first board layer is a high-density polyisocyanurate or predominately polyisocyanurate material; and the prefabricated, faced roofing board composite is a prefabricated, faced cover board composite.

14. The prefabricated, faced roofing board composite according to claim 7, wherein:
the polymeric material or predominately polymeric material of the first board layer has an average density of less than 6 lbs/ft$^3$ and the thickness is at least 0.50 inches; the polymeric material or predominately polymeric material of the first board layer is a low-density polyisocyanurate or predominately polyisocyanurate foam material; and the prefabricated, faced roofing board composite is a prefabricated, faced insulation board composite.

15. The prefabricated, faced roofing board composite according to claim 7, including:
a second fiberglass-based facer that is fire resistant; the second fiberglass-based facer having a length, a width, and a thickness; the second fiberglass-based facer having first and second major surfaces that are each defined by the length and the width of the second fiberglass-based facer; the second fiberglass-based facer being substantially impervious to the passage of hot gases of combustion through the thickness of the second fiberglass-based facer; and
the second fiberglass-based facer being substantially coextensive with and bonded to the bottom major surface of the first board layer; and the polymeric material or predominantly polymeric material of the first board layer penetrating part of the way through, but not completely through, the second fiberglass-based facer from the first major surface of the second fiberglass-based facer to effect a strong bond between the second fiberglass-based facer and the bottom major surface of the first board layer while the second major surface of the second fiberglass-based facer is free of the polymeric material or predominantly polymeric material of the first board layer.

16. The prefabricated, faced roofing board composite according to claim 7, including:
a second board layer made of a polymeric material or a predominantly polymeric material; the second board layer having a length, a width, and a thickness; the second board layer having a top major surface and a bottom major surface that are each defined by the length and the width of the second board layer; the top major surface of the second board layer being substantially coextensive with and bonded to the bottom major surface of the first board layer;
the polymeric material or predominately polymeric material of the first board layer has an average density between 6 lbs/ft$^3$ and 25 lbs/ft$^3$ and the thickness is at least 0.08 inches; the polymeric material or predominately polymeric material of the first board layer is a high-density polyisocyanurate or predominately polyisocyanurate material; and the first board layer forms a cover board layer of the prefabricated, faced roofing board composite; and
the polymeric material or predominately polymeric foam material of the second board layer has an average density less than 6 lbs/ft$^3$ and the thickness is at least 0.50 inches; the polymeric material or predominately polymeric foam material of the second board layer is a low-density polyisocyanurate or predominately polyisocyanurate foam material; and the second board layer forms an insulation board layer of the prefabricated, faced roofing board composite.

17. The prefabricated, faced roofing board composite according to claim 16, including:
a second fiberglass-based facer that is fire resistant; the second fiberglass based facer having a length, a width, and a thickness; the second fiberglass-based facer having first and second major surfaces that are each defined by the length and the width of the second fiberglass-based facer; the second fiberglass-based facer being substantially impervious to the passage of hot gases of combustion through the thickness of the second fiberglass-based facer; and
the second fiberglass-based facer being substantially coextensive with and bonded to the bottom major surface of the second board layer; and the polymeric material or predominantly polymeric foam material of the second board layer penetrating part of the way through, but not completely through, the second fiberglass-based facer from the first major surface of the second fiberglass-based facer to effect a strong bond between the second fiberglass-based facer and the bottom major surface of the second board layer while the second major surface of the second fiberglass-based facer is free of the polymeric material or predominantly polymeric foam material of the second board layer.

18. The prefabricated, faced roofing board composite according to claim 7, wherein:
the polymeric material or predominately polymeric material of the first board layer is a high-density polyisocyanurate or predominately polyisocyanurate material, the first board layer has an average density between 6 lbs/ft$^3$ and 25 lbs/ft$^3$, the thickness of the first board layer is at least 0.08 inches, and the first board layer forms a cover board layer of the prefabricated, faced roofing board composite;
the prefabricated, faced roofing board composite includes a second board layer made of a polymeric material or a predominantly polymeric foam material; the second board layer has a length, a width, and a thickness; the second board layer has a top major surface and a bottom major surface that are each defined by the length and the width of the second board layer; the top major surface of the second board layer being substantially coextensive with and bonded to the bottom major surface of the first board layer; the polymeric material or predominately polymeric foam material of the second board layer is a low-density polyisocyanurate or predominately polyisocyanurate foam material, the second board layer has an average density less than 6 lbs/ft$^3$, the thickness of the second board layer is at least 0.50 inches, and the second board layer forms an insulation board layer of the prefabricated, faced roofing board composite; and
the prefabricated, faced roofing board composite includes a third board layer made of a polymeric material or a predominantly polymeric material; the third board layer has a length, a width, and a thickness; the third board layer has a top major surface and a bottom major surface that are each defined by the length and the width of the third board layer; the top major surface of the third board layer is substantially coextensive with and bonded to the bottom major surface of the second board layer; the polymeric material or predominately polymeric material of the third board layer is a high-density polyisocyanurate or predominately polyisocyanurate material, the third board layer has an average density between 6 lbs/ft$^3$ and 25 lbs/ft$^3$, the thickness of the third board layer is at least 0.08 inches, and the third board layer forms a baseboard layer of the prefabricated, faced roofing board composite.

19. The prefabricated, faced roofing board composite according to claim 18, including:
a second fiberglass-based facer that is fire resistant; the second fiberglass-based facer having a length, a width, and a thickness; the second fiberglass-based facer having first and second major surfaces that are each defined by the length and the width of the second fiberglass-based facer; the second fiberglass-based facer being substantially impervious to the passage of hot gases of combustion through the thickness of the second fiberglass-based facer; and
the second fiberglass-based facer being substantially coextensive with and bonded to the bottom major surface of the third board layer; and the polymeric material or predominantly polymeric material of the third board layer penetrating part of the way through, but not completely through, the second fiberglass-based facer from the first major surface of the second fiberglass-based facer to effect a strong bond between the second fiberglass-based facer and the bottom major surface of the third board layer while the second major surface of the second fiberglass-based facer is free of the polymeric material or predominantly polymeric material of the third board layer.

20. A facer for improving the fire resistance and weathering properties of a polymeric material roofing board, comprising:
a fire and weather resistant fiberglass-based facer having a length, a width, and a thickness; the fiberglass-based facer having first and second major surfaces that are each defined by the length and the width of the fiberglass-based facer; the fiberglass-based facer comprising between about 15% and 25% by weight fiberglass mat having interstices and between about 75% and 85% by weight polymer based mineral filler carrier containing mineral filler; the interstices of the fiberglass mat being filled with the mineral filler and the polymer based mineral filler carrier to the extent that the fiberglass-based facer has a Gurley porosity of at least 300 and is substantially impervious to a passage through the thickness of the fiberglass-based facer of hot gases of combustion and water vapor; and the polymer based mineral filler carrier containing the mineral filler being incorporated into the fiberglass-based facer at and adjacent the second major surface of the fiberglass mat and not at and adjacent the first major surface of the fiberglass mat for permitting a limited penetration of a liquid polymeric or predominately polymeric material through the first major surface of the fiberglass-based facer into, but only part way through, the fiberglass-based facer when the fiberglass-based facer overlies a liquid polymeric or predominately polymeric material during the formation of a polymeric roofing board from the liquid polymeric or predominately polymeric material to effect a strong bond between the fiberglass-based facer and the polymeric roofing board thus formed without permitting the liquid polymeric or predominately polymeric material to pass through the fiberglass-based facer to the second major surface.

21. The facer for improving the fire resistance and weathering properties of a polymeric material roofing board according to claim 20, wherein:
the polymer based mineral filler carrier is a latex based mineral filler carrier.

22. A prefabricated, faced roofing board composite, comprising:
a first board layer made of a polymeric material or a predominantly polymeric material; and a first fire and weather resistant fiberglass-based facer;
the first board layer having a density, a length, a width, and a thickness; the first board layer having a top major surface and a bottom major surface that are each defined by the length and the width of the first board layer;
the first fiberglass-based facer having a length, a width, and a thickness; the first fiberglass-based facer having first and second major surfaces that are each defined by the length and the width of the first fiberglass-based facer; the first fiberglass-based facer comprising between about 15% and 25% by weight a first fiberglass mat having interstices and between about 75% and 85% by weight a first polymer based mineral filler carrier containing mineral filler; the interstices of the first fiberglass mat being filled with the first polymer based mineral filler carrier and its mineral filler to the extent that the first fiberglass-based facer has a Gurley porosity of at least 300 and is substantially impervious to a passage through the thickness of the first fiberglass-based facer of hot gases of combustion and water vapor; the first polymer based mineral filler carrier containing the mineral filler being incorporated into the first fiberglass-based facer at and adjacent the second major surface of the first fiberglass mat and not at and adjacent the first major surface of the first fiberglass mat for permitting a limited penetration of a liquid polymeric or predominately polymeric material through the first major surface of the first fiberglass-based facer into, but only part way through, the first fiberglass-based facer when the first fiberglass-based facer overlies a liquid polymeric or predominately polymeric material during the formation of a polymeric roofing board from the liquid polymeric material; and the first fiberglass-based facer being substantially coextensive with and bonded to the top major surface of the first board layer; and the polymeric material or predominantly polymeric material of the first board layer penetrating part of the way through, but not completely through, the first fiberglass-based facer from the first major surface of the first fiberglass-based facer to effect a strong bond between the first fiberglass-based facer and the top major surface of the first board layer while the second major surface of the first fiberglass-based facer is free of the polymeric material or predominantly polymeric material of the first board layer.

23. The prefabricated, faced roofing board composite according to claim 22, wherein:

the polymeric material or predominately polymeric material of the first board layer has an average density between about 1.2 lbs/ft$^3$ and about 25 lbs/ft$^3$.

24. The prefabricated, faced roofing board composite according to claim 22, wherein:

the polymeric material or predominately polymeric material of the first board layer has an average density between 6 lbs/ft$^3$ and 25 lbs/ft$^3$; and the prefabricated, faced roofing board composite is a prefabricated, faced cover board composite.

25. The prefabricated, faced roofing board composite according to claim 24, wherein:

the polymeric material or predominately polymeric material of the first board layer is a high-density polyisocyanurate or predominately polyisocyanurate material; and the thickness of the first board layer is at least 0.08 inches.

26. The prefabricated, faced roofing board composite according to claim 22, wherein:

the polymeric material or predominately polymeric material of the first board layer has an average density of less than 6 lbs/ft$^3$; and the prefabricated, faced roofing board composite is a prefabricated, faced insulation board composite.

27. The prefabricated, faced roofing board composite according to claim 26, wherein:

the polymeric material or predominately polymeric material of the first board layer is a low-density polyisocyanurate or predominately polyisocyanurate foam material; and the thickness of the first board layer is at least 0.50 inches.

28. The prefabricated, faced roofing board composite according to claim 22, including:

a second fiberglass-based facer that is fire resistant and has a length, a width, and a thickness; the second fiberglass-based facer having first and second major surfaces that are each defined by the length and the width of the second fiberglass-based facer; the second fiberglass-based facer comprising between about 15% and 25% by weight a second fiberglass mat having interstices and between about 75% and 85% by weight a second polymer based mineral filler carrier containing mineral filler; the interstices of the second fiberglass mat being filled with the second polymer based mineral filler carrier and its mineral filler to the extent that the second fiberglass-based facer has a Gurley porosity of at least 300 and is substantially impervious to the passage through the thickness of the second fiberglass-based facer of hot gases of combustion; the second polymer based mineral filler carrier being incorporated into the second fiberglass-based facer at and adjacent the second major surface of the second fiberglass mat and not at and adjacent the first major surface of the second fiberglass mat for permitting a limited penetration of a liquid polymeric or predominately polymeric material through the first major surface of the second fiberglass-based facer into, but only part of the way through, the second fiberglass-based facer when the second fiberglass-based facer overlies a liquid polymeric or predominately polymeric material during the formation of a polymeric roofing board from a liquid polymeric or predominately polymeric material; and the second fiberglass-based facer being substantially coextensive with and bonded to the bottom major surface of the first board layer; and the polymeric material or predominantly polymeric material of the first board layer penetrating part of the way through, but not completely through, the second fiberglass-based facer from the first major surface of the second fiberglass-based facer to effect a strong bond between the second fiberglass-based facer and the bottom major surface of first board layer while the second major surface of the second fiberglass-based facer is free of the polymeric material or predominantly polymeric material of the first board layer.

29. The prefabricated, faced roofing board composite according to claim 22, including:

a second board layer made of a polymeric material or a predominantly polymeric material; the second board layer having a length, a width, and a thickness; the second board layer having a top major surface and a bottom major surface that are each defined by the length and the width of the second board layer; the second board layer having a density that differs from the density of the first board layer; and the top major surface of the second board layer being substantially coextensive with and bonded to the bottom major surface of the first board layer.

30. The prefabricated, faced roofing board composite according to claim 29, wherein:

the polymeric material or predominately polymeric material of the first board layer has an average density between 6 lbs/ft$^3$ and 25 lbs/ft$^3$; the polymeric material or predominately polymeric material of the first board layer is a high-density polyisocyanurate or predominately polyisocyanurate material; the thickness of the first board layer is at least 0.08 inches; and the first board layer forms a cover board layer of the prefabricated, faced roofing board composite; and the polymeric material or predominately polymeric foam material of the second board layer has an average density less than 6 lbs/ft$^3$; the polymeric material or predominately polymeric foam material of the second board layer is a low-density polyisocyanurate or predominately polyisocyanurate foam material; the thickness of the second board layer is at least 0.50 inches; and the second board layer forms an insulation board layer of the prefabricated, faced roofing board composite.

31. The prefabricated, faced roofing board composite according to claim 30, including:
a second fiberglass-based facer that is fire resistant and has a length, a width, and a thickness; the second fiberglass-based facer having first and second major surfaces that are each defined by the length and the width of the second fiberglass-based facer; the second fiberglass-based facer comprising between about 15% and 25% by weight a second fiberglass mat having interstices and between about 75% and 85% by weight a second polymer based mineral filler carrier containing mineral filler; the interstices of the second fiberglass mat being filled with the second polymer based mineral filler carrier and its mineral filler to the extent that the second fiberglass-based facer has a Gurley porosity of at least 300 and is substantially impervious to the passage through the thickness of the second fiberglass-based facer of hot gases of combustion; the second polymer based mineral filler carrier being incorporated into the second fiberglass-based facer at and adjacent the second major surface of the second fiberglass mat and not at and adjacent the first major surface of the second fiberglass mat for permitting a limited penetration of a liquid polymeric or predominately polymeric material through the first major surface of the second fiberglass-based facer into, but only part of the way through, the second fiberglass-based facer when the second fiberglass-based facer overlies a liquid polymeric or predominately polymeric material during the formation of a polymeric roofing board from the liquid polymeric or predominately polymeric material; and
the second fiberglass-based facer being substantially coextensive with and bonded to the bottom major surface of the second board layer; and the polymeric material or predominantly polymeric material of the second board layer penetrating part of the way through, but not completely through, the second fiberglass-based facer from the first major surface of the second fiberglass-based facer to effect a strong bond between the second fiberglass-based facer and the bottom major surface of second board layer while the second major surface of the second fiberglass-based facer is free of the polymeric material or predominantly polymeric material of the first board layer.

32. The prefabricated, faced roofing board composite according to claim 22, wherein:
the polymeric material or predominately polymeric material of the first board layer has an average density between 6 lbs/ft$^3$ and 25 lbs/ft$^3$; the polymeric material or predominately polymeric material of the first board layer is a high-density polyisocyanurate or predominately polyisocyanurate material; the thickness of the first board layer is at least 0.08 inches; and the first board layer forms a cover board layer of the prefabricated, faced roofing board composite;
the prefabricated, faced roofing board composite includes a second board layer made of a polymeric material or a predominantly polymeric foam material; the second board layer having a length, a width, and a thickness; the second board layer having a top major surface and a bottom major surface that are each defined by the length and the width of the second board layer; the top major surface of the second board layer being substantially coextensive with and bonded to the bottom major surface of the first board layer; the polymeric material or predominately polymeric foam material of the second board layer has an average density less than 6 lbs/ft$^3$; the polymeric material or predominately polymeric foam material of the second board layer is a low-density polyisocyanurate or predominately polyisocyanurate foam material; the thickness of the second board layer is at least 0.50 inches; and the second board layer forms an insulation board layer of the prefabricated, faced roofing board composite; and
a third board layer made of a polymeric material or a predominantly polymeric material; the third board layer having a length, a width, and a thickness; the third board layer having a top major surface and a bottom major surface that are each defined by the length and the width of the third board layer; the top major surface of the third board layer being substantially coextensive with and bonded to the bottom major surface of the second board layer; the polymeric material or predominately polymeric material of the third board layer has an average density between 6 lbs/ft$^3$ and 25 lbs/ft$^3$; the polymeric material or predominately polymeric material of the third board layer is a high-density polyisocyanurate or predominately polyisocyanurate material; the thickness of the first board layer is at least 0.08 inches; and the third board layer forms a baseboard layer of the prefabricated, faced roofing board composite.

33. The prefabricated, faced roofing board composite according to claim 32, including:
a second fiberglass-based facer that is fire resistant and has a length, a width, and a thickness; the second fiberglass-based facer having first and second major surfaces that are each defined by the length and the width of the second fiberglass-based facer; the second fiberglass-based facer comprising between about 15% and 25% by weight a second fiberglass mat having interstices and between about 75% and 85% by weight a second polymer based mineral filler carrier containing mineral filler; the interstices of the second fiberglass mat being filled with the second polymer based mineral filler carrier and its mineral filler to the extent that the second fiberglass-based facer has a Gurley porosity of at least 300 and is substantially impervious to the passage through the thickness of the second fiberglass-based facer of hot gases of combustion; the second polymer based mineral filler carrier being incorporated into the second fiberglass-based facer at and adjacent the second major surface of the second fiberglass mat and not at and adjacent the first major surface of the second fiberglass mat for permitting a limited penetration of a liquid polymeric or predominately polymeric material through the first major surface of the second fiberglass-based facer into, but only part of the way through, the second fiberglass-based facer when the second fiberglass-based facer overlies a liquid polymeric or predominately polymeric material during the formation of a polymeric roofing board from the liquid polymeric or predominately polymeric material; and
the second fiberglass-based facer being substantially coextensive with and bonded to the bottom major surface of the third board layer; and the polymeric material or predominantly polymeric material of the third board layer penetrating part of the way through, but not completely through, the second fiberglass-based facer from the first major surface of the second fiberglass-based facer to effect a strong bond between the second fiberglass-based facer and the bottom major surface of third board layer while the second major surface of the second fiberglass-based facer is free of the polymeric material or predominantly polymeric material of the third board layer.

34. The prefabricated, faced roofing board composite according to claim 22, wherein:

the polymer based mineral filler carrier is a latex based mineral filler carrier.

* * * * *